(12) United States Patent
Bensel et al.

(10) Patent No.: US 10,914,029 B2
(45) Date of Patent: Feb. 9, 2021

(54) FLUID SENSOR ASSEMBLY FOR A WASHING MACHINE APPLIANCE

(71) Applicant: Haier US Appliance Solutions, Inc., Wilmington, DE (US)

(72) Inventors: Peter Hans Bensel, Louisville, KY (US); Jose Francisco Castillo, Toledo, OH (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 145 days.

(21) Appl. No.: 16/128,602

(22) Filed: Sep. 12, 2018

(65) Prior Publication Data

US 2020/0080247 A1 Mar. 12, 2020

(51) Int. Cl.
  *D06F 39/02* (2006.01)
  *D06F 34/14* (2020.01)
  *G01F 23/24* (2006.01)

(52) U.S. Cl.
  CPC ............ *D06F 39/022* (2013.01); *D06F 34/14* (2020.02); *D06F 2202/085* (2013.01); *G01F 23/24* (2013.01)

(58) Field of Classification Search
  CPC .. D06F 39/022; D06F 2202/085; D06F 34/14; G01F 23/24
  See application file for complete search history.

(56) References Cited

U.S. PATENT DOCUMENTS

| 4,383,544 | A | * | 5/1983 | Vosper | F24H 9/2007 |
| | | | | | 122/504 |
| 4,879,902 | A | * | 11/1989 | Loniello | G01F 23/242 |
| | | | | | 73/304 R |
| 4,902,962 | A | * | 2/1990 | Ishikawa | G01F 23/242 |
| | | | | | 324/441 |
| 4,921,129 | A | * | 5/1990 | Jones | A47L 15/44 |
| | | | | | 116/227 |
| 5,843,378 | A | * | 12/1998 | El-Hage | G01F 23/24 |
| | | | | | 222/1 |
| 6,938,478 | B2 | * | 9/2005 | Arias | G01F 23/24 |
| | | | | | 73/290 R |
| 8,424,345 | B2 | | 4/2013 | Park et al. | |
| 2002/0026828 | A1 | * | 3/2002 | Fehrenbach | G01F 23/284 |
| | | | | | 73/290 V |
| 2007/0234796 | A1 | * | 10/2007 | Tshishiku | G01F 23/242 |
| | | | | | 73/290 R |

(Continued)

*Primary Examiner* — Joseph L. Perrin
(74) *Attorney, Agent, or Firm* — Dority & Manning, P.A.

(57) ABSTRACT

A fluid sensor assembly for a washing machine appliance is provided herein. The fluid sensor assembly may include a first conductivity rod, a second conductivity rod, and a chamber sheath. The first conductivity rod may extend between a top rod end and a bottom rod end. The second conductivity rod may extend between a top rod end and a bottom rod end. The chamber sheath may include a non-permeable sidewall and a sealed top wall. The non-permeable sidewall may extend about the first conductivity rod from a top sheath end to a bottom sheath end. The top sheath end may be positioned on the sealed top wall. At least a portion of the bottom sheath end may be positioned above the bottom rod end of the first conductivity rod. The non-permeable sidewall may be radially spaced apart from the first conductivity rod and define a radial chamber therebetween.

13 Claims, 10 Drawing Sheets

(56) References Cited

U.S. PATENT DOCUMENTS

| | | | |
|---|---|---|---|
| 2012/0152290 A1* | 6/2012 | Brosnan | A47L 15/449 |
| | | | 134/115 R |
| 2012/0324995 A1* | 12/2012 | Tincher | G01F 23/243 |
| | | | 73/304 C |
| 2013/0049969 A1* | 2/2013 | Kappler | D06F 39/022 |
| | | | 340/618 |
| 2015/0276455 A1 | 10/2015 | Trbojevic et al. | |
| 2017/0030005 A1 | 2/2017 | Kranjc | |

* cited by examiner

FLUID SENSOR ASSEMBLY FOR A WASHING MACHINE APPLIANCE

FIELD OF THE INVENTION

The present subject matter relates generally to fluid sensor assemblies, and more particularly to fluid sensor assemblies for detecting the presence of liquid detergent in a bulk tank within a washing machine appliance.

BACKGROUND OF THE INVENTION

Washing machine appliances generally include a tub contained within a cabinet for containing water or wash fluid (e.g., water and detergent, bleach, fabric softener, or other wash additives). A basket is rotatably mounted within the tub and defines a wash chamber for receipt of articles for washing. During normal operation of such washing machine appliances, the wash fluid may be directed into the tub and onto articles within the wash chamber of the basket. The basket or an agitation element can rotate at various speeds to agitate articles within the wash chamber, to wring wash fluid from articles within the wash chamber, etc.

In some existing systems, a dispenser box may be provided within the cabinet to contain and dispense one or more wash additives. For instance, during operation of certain machine appliances, a volume of wash fluid is directed into the tub in order to wash or rinse articles within the wash chamber. The one or more wash additives may be added to the wash fluid from the dispenser box to enhance the cleaning or other properties of the wash fluid. Although some washing machine appliances include bulk dispensers for storing larger levels of wash additive (e.g., large enough to cover multiple wash loads or cycles), such systems suffer from notable drawbacks.

For instance, it may be difficult for the washing machine appliance or user to know how much wash additive is present within the bulk dispenser. If one or more sensors were incorporated into the bulk dispenser, it is possible that liquid detergent or residue would accumulate on the sensors over time. Such accumulation or residue may lead to erroneous readings at the fluid sensors. As an example, liquid detergent may stick to a top wall or sidewall of the bulk dispenser and form an electrical connection between two adjacent conductivity sensors. Even if the level of liquid detergent is decreased and fall below the conductivity sensors, the electrical connection may persist. As a result, the conductivity sensors may thus be unable to detect the decrease.

As a result, there is a need for improved fluid sensor assemblies for washing machine appliances. In particular, it would be advantageous to provide a fluid sensor assembly or washing machine appliance addressing one or more the above identified issues.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a fluid sensor assembly is provided. The fluid sensor assembly may include a first conductivity rod, a second conductivity rod, and a chamber sheath. The first conductivity rod may extend between a top rod end and a bottom rod end. The bottom rod end of the first conductivity rod may be positioned below the top rod end of the first conductivity rod. The second conductivity rod may extend between a top rod end and a bottom rod end. The bottom rod end of the second conductivity rod may be positioned below the top rod end of the second conductivity rod. The chamber sheath may include a non-permeable sidewall and a sealed top wall. The non-permeable sidewall may extend about the first conductivity rod from a top sheath end to a bottom sheath end. The bottom sheath end may be positioned below the top sheath end. The top sheath end may be positioned on the sealed top wall. At least a portion of the bottom sheath end may be positioned above the bottom rod end of the first conductivity rod. The non-permeable sidewall may be radially spaced apart from the first conductivity rod and define a radial chamber therebetween.

In another exemplary aspect of the present disclosure, a washing machine appliance is provided. The washing machine appliance may include a cabinet, a basket, a storage tank, and a fluid sensor assembly. The cabinet may extend along a vertical direction from a top end to a bottom end. The cabinet may further extend along a transverse direction from a front end to a rear end. The basket may be mounted within the cabinet. The basket may define a chamber for receipt of a load of items for washing. The storage tank may be positioned within the cabinet. The storage tank may define a bulk cavity for receiving a wash additive. The fluid sensor assembly may be mounted to the storage tank. The fluid sensor assembly may include a first conductivity rod, a second conductivity rod, and a chamber sheath. The first conductivity rod may extend between a top rod end and a bottom rod end. The bottom rod end of the first conductivity rod may be positioned within the bulk cavity below the top rod end of the first conductivity rod. The second conductivity rod may extend between a top rod end and a bottom rod end. The bottom rod end of the second conductivity rod may be positioned within the bulk cavity below the top rod end of the second conductivity rod. The chamber sheath may include a non-permeable sidewall and a sealed top wall. The non-permeable sidewall may extend about the first conductivity rod from a top sheath end to a bottom sheath end. The bottom sheath end may be positioned within the bulk cavity below the top sheath end. The top sheath end may be positioned on the sealed top wall. At least a portion of the bottom sheath end may be positioned above the bottom rod end of the first conductivity rod. The non-permeable sidewall may be radially spaced apart from the first conductivity rod and define a radial chamber therebetween.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Furthermore, as used herein, terms of approximation, such as "approximately," "substantially," or "about," refer to being within a ten percent margin of error.

Figure 1:
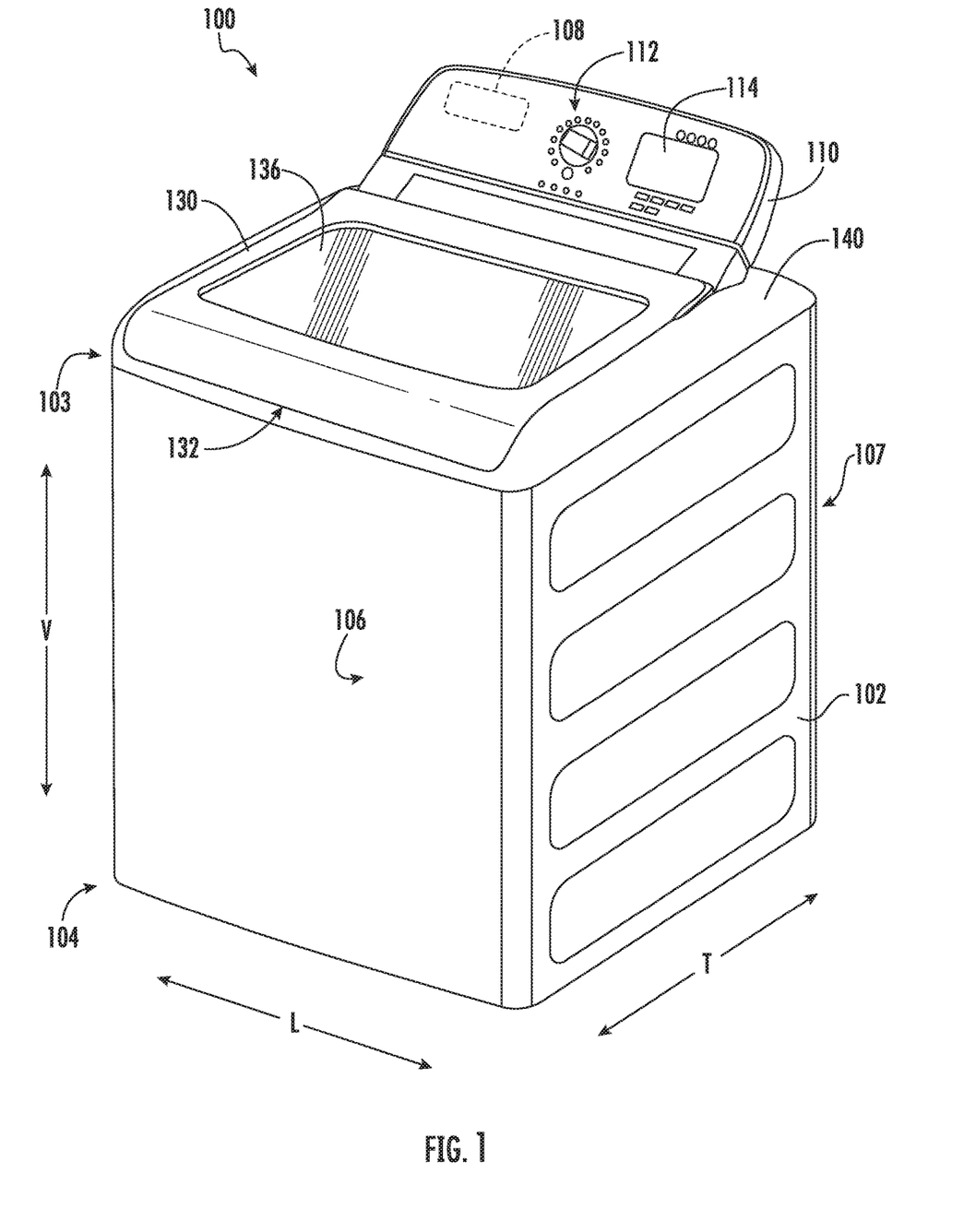
FIG. 1 provides a perspective view of a washing machine appliance according to exemplary embodiments of the present disclosure, with the door shown in a closed position.
Figure 2:
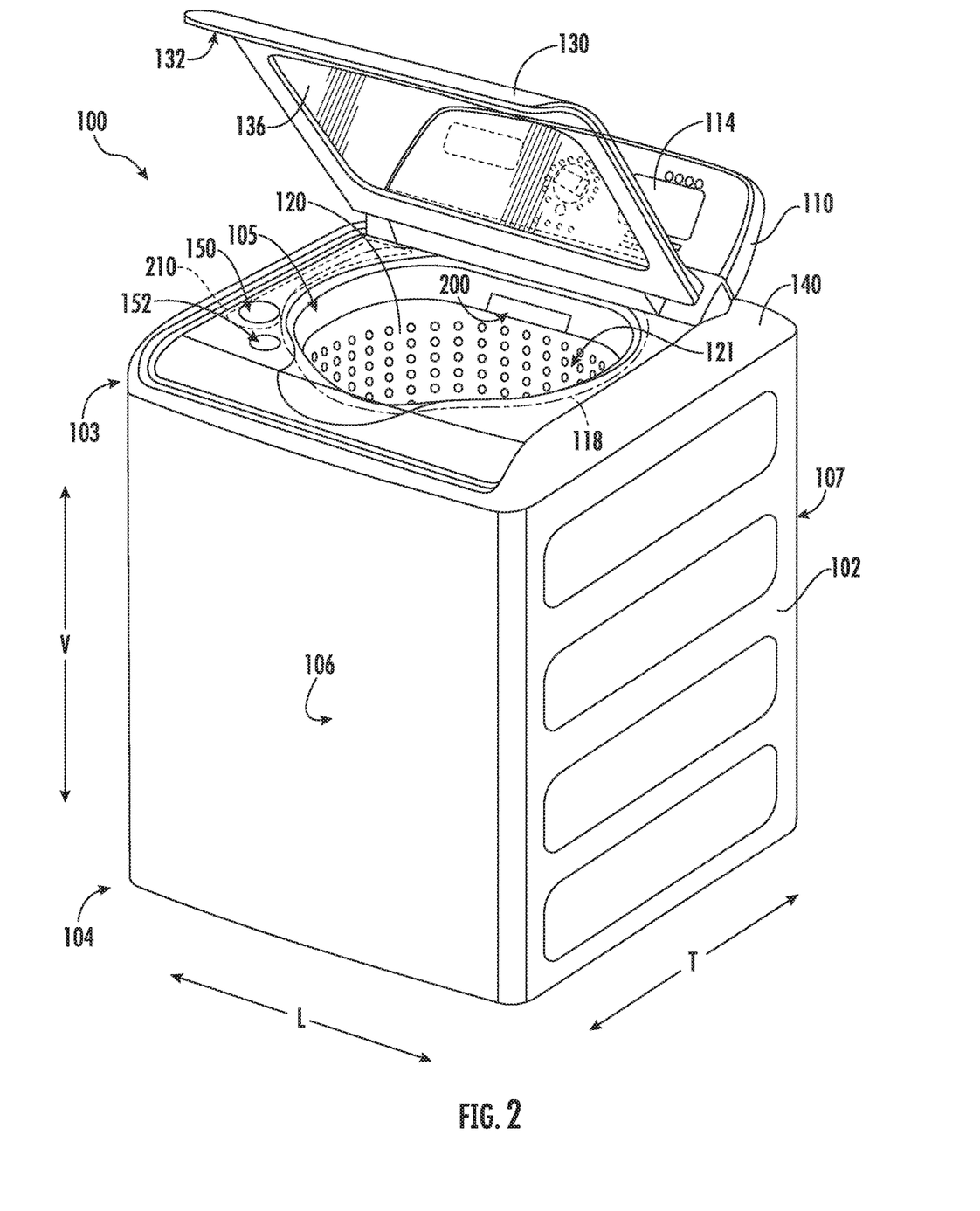
FIG. 2 provides a perspective view of the exemplary washing machine appliance of FIG. 1 with the door shown in an open position.

Turning now to the figures, FIGS. 1 and 2 illustrate an exemplary embodiment of a vertical axis washing machine appliance 100. In FIG. 1, a lid or door 130 is shown in a closed position. In FIG. 2, door 130 is shown in an open position. Washing machine appliance 100 generally defines a vertical direction V, a lateral direction L, and a transverse direction T, which are mutually perpendicular with one another, such that an orthogonal coordinate system is generally defined.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, or different features may also be utilized with the present subject matter as well (e.g., horizontal axis washing machines).

Washing machine appliance 100 has a cabinet 102 that extends between a top end or portion 103 and a bottom end or portion 104 along the vertical direction V and between a front end or portion 106 and a rear end or portion 107 along the transverse direction T. A wash tub 118 is disposed within cabinet 102, and a wash basket 120 is rotatably mounted within tub 118. A motor (not shown) is in mechanical communication with wash basket 120 to selectively rotate wash basket 120 (e.g., during an agitation or a rinse cycle of washing machine appliance 100). Wash basket 120 defines a wash chamber 121 that is configured for receipt of articles for washing. Tub 118 holds wash and rinse fluids for agitation in wash basket 120 within tub 118. In some embodiments, an agitator or impeller (not shown) extends into wash basket 120 and is also in mechanical communication with the motor. The impeller assists agitation of articles disposed within wash basket 120 during operation of washing machine appliance 100.

In some embodiments, cabinet 102 of washing machine appliance 100 has a top panel 140 (e.g., at top portion 103 of cabinet 102). Top panel 140 defines an aperture 105 that permits user access to wash basket 120 of tub 118. Door 130, rotatably mounted to top panel 140, permits selective access to aperture 105. In some such embodiments, door 130 selectively rotates between the closed position shown in FIG. 1 and the open position shown in FIG. 2. In the closed position, door 130 inhibits access to wash basket 120. Conversely, in the open position, a user can access wash basket 120. A window 136 in door 130 permits viewing of wash basket 120 when door 130 is in the closed position (e.g., during operation of washing machine appliance 100). Door 130 also includes a handle 132 that, for example, a user may pull or lift when opening and closing door 130. Further, although door 130 is illustrated as mounted to top panel 140, door 130 may alternatively be mounted to another portion of cabinet 102, or any other suitable support.

Top panel 140 may also define one or more openings 150, 152 (e.g., at a corner of top panel 140 at or adjacent a front portion of top panel 140), as shown in FIG. 2. At least one opening 150 or 152 is configured for receipt of one of a plurality of fluid additives (e.g., detergent, fabric softener, or bleach). Opening 150 or 152 permits the fluid additive to pass through top panel 140 to a reservoir or bulk tank 210 disposed below top panel 140 along the vertical direction V. Thus, a user may pour the fluid additive into bulk tank 210 through opening 150 or 152 in top panel 140.

In certain embodiments, a control panel 110 with at least one input selector 112 extends from top panel 140 (e.g., at a rear portion of cabinet 102 opposite opening 150 or 152 about aperture 105 along the transverse direction T). Control panel 110 and input selector 112 may collectively form a user interface input for operator selection of machine cycles and features. In additional or alternative embodiments, a display 114 of control panel 110 indicates selected features, operation mode, a countdown timer, or other items of interest to appliance users regarding operation.

Operation of washing machine appliance 100 may generally be controlled by a controller or processing device 108 that is operatively coupled to control panel 110 for user manipulation to select washing machine cycles and features. In response to user manipulation of control panel 110, controller 108 operates the various components of washing machine appliance 100 to execute selected machine cycles and features.

Controller 108 may include a memory (e.g., non-transitive media) and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 100 may be constructed without using a microprocessor (e.g., using a combination of discrete analog or digital logic circuitry, such as switches, amplifiers, integrators, comparators, flip-flops, AND gates, and the like) to perform control functionality instead of relying upon software. Control panel 110 and other components of washing machine appliance 100 may be in communication with controller 108 via one or more signal lines or shared communication busses.

During operation of washing machine appliance 100, laundry items may be loaded into wash basket 120 through aperture 105, and a washing operation may be initiated through operator manipulation of input selectors 112. During some such operations, tub 118 is filled with water and detergent or other fluid additives via dispenser box assembly 200. One or more valves can be controlled by washing machine appliance 100 to provide for filling wash basket 120 to the appropriate level for the amount of articles being washed or rinsed. By way of example, for a wash mode, once wash basket 120 is properly filled with fluid, the contents of wash basket 120 can be agitated (e.g., with an impeller as discussed previously) for washing of laundry items in wash basket 120.

After the agitation phase of the wash cycle is completed, wash basket 120 can be drained. Laundry articles can then be rinsed by again adding fluid to wash basket 120 depending on the specifics of the cleaning cycle or operation selected by a user. The impeller may again provide agitation within wash basket 120. One or more spin cycles also may be used. In particular, a spin cycle may be applied after the wash cycle or after the rinse cycle to wring wash fluid from the articles being washed. During a spin cycle, wash basket 120 is rotated at relatively high speeds. After articles disposed in wash basket 120 are cleaned or washed, the user can remove the articles from wash basket 120 (e.g., by reaching into wash basket 120 through aperture 105).

Figure 3:
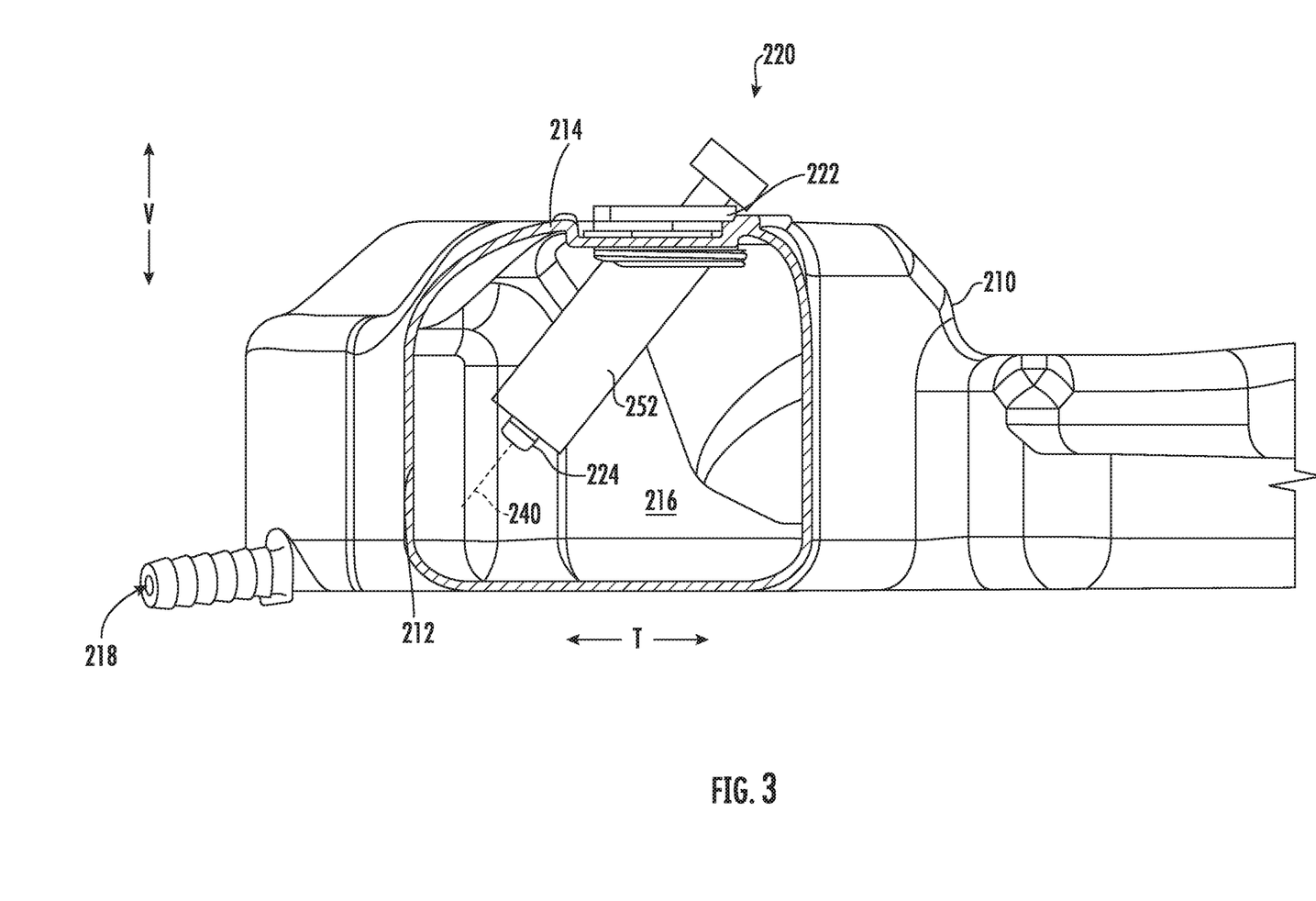
FIG. 3 provides a side perspective view of a bulk tank and fluid sensor assembly according to exemplary embodiments of the present disclosure, wherein a portion of the bulk tank has been removed for clarity.

As shown in FIG. 3, a bulk tank 210 having one or more tank walls (e.g., tank sidewall 212 or tank top wall 214) may define a tank cavity 216 to receive a wash additive therein (e.g., from one or more of the openings 150 or 152—FIG. 2). A tank outlet 218 may extend through one or more of the walls 212, 214 permit the selective dispensing of wash additive from the tank cavity 216. As noted above, the bulk tank 210 may be in fluid communication with the dispenser box 200. For instance, the tank cavity 216 may be upstream from the dispenser box 200 such that wash additive is provided through the tank outlet 218 is selectively directed to the dispenser box 200. From the dispenser box 200, wash additive may be mixed with one or more other fluids (e.g., water) or directed to the wash chamber 121.

Turning now generally to FIGS. 3 through 7, a fluid sensor assembly 220 is mounted in communication with tank cavity 216 (e.g., to detect the level or volume of wash additive therein). In some such embodiments, the fluid sensor assembly 220 includes an assembly body 222 that is mounted to the bulk tank 210. As an example, the assembly body 222 may be mounted to a top wall 214 of the bulk tank 210. At least a portion of the fluid sensor assembly 220 is positioned in the tank cavity 216 as further described below. Assembly body 222 may be selectively fixed to the bulk tank 210 or, alternatively, integrally formed with at least one wall (e.g., tank top wall 214) of the bulk tank 210 (e.g., such that bulk tank 210 and assembly body 222 form a monolithic unitary structure).

Two or more conductivity rods (e.g., a first conductivity rod 224 and a second conductivity rod 226) are supported on assembly body 222. In some embodiments, a mounting plate 230 of assembly body 222 defines multiple discrete apertures through which the two or more conductivity rods may be held. As an example, mounting plate 230 may define a first aperture 232 within which the first conductivity rod 224 is held, and a second aperture 234 through which the second conductivity rod 226 may be held.

Generally, each conductivity rod extends between a top rod end and a bottom rod end. For instance, the first conductivity rod 224 may extend along the first axis 240 between a top rod end 236A and a bottom rod end 238A; the second conductivity rod 226 may extend along a second axis 242 between the top rod end 236B and a bottom rod end 238B. When assembled and in use, the bottom rod end 238A, 238B or of each conductivity rod 224, 226 is generally positioned below the top rod end 236A, 236B of the corresponding conductivity rod 224, 226 (e.g., along the vertical direction V). In certain embodiments, the top rod end 236A 236B of each conductivity rod 224, 226 is held outside of the tank cavity 216 while the bottom rod end 238A, 238B is held within the tank cavity 216. Additionally or alternatively, the top rod end 236A, 236B of each conductivity rod 224, 226 may be positioned proximal to the mounting plate 230 (e.g., relative to the bottom rod end 238A, 238B, which is distal to the mounting plate 230).

In some embodiments, one or more conductivity rods are positioned parallel to each other. For instance, the first conductivity rod 224 may be generally parallel to the second conductivity rod 226. In some such embodiments, the first axis 240 along which the first conductivity rod 224 extends is parallel to the second axis 242 along which the second conductivity rod 226 extends. When assembled, the first conductivity rod 224 and the second conductivity rod 226 may be spaced apart from each other, such as in a direction that is perpendicular to the vertical direction V (e.g., the lateral direction L). Furthermore, in some embodiments, first conductivity rod 224 and second conductivity rod 226 may be positioned at the same general height. In particular, the bottom rod end 238A of the first conductivity rod 224 may be located at the same vertical position as the bottom rod end 238B of the second conductivity rod 226. Additionally or alternatively, the first conductivity rod 224 and second conductivity rod 226 may define same or equal length. As an example, the first conductivity rod 224 may define a first length 246 between the top and bottom rod ends 236A and 238A thereof (e.g., along the first axis 240), while the second conductivity rod 226 defines a second length 248 between the top and bottom rod ends 236B and 238B thereof (e.g., along the second axis 242).

As shown, at least one chamber sheath 252 is provided on the assembly body 222 about at least a portion of one conductivity rod (e.g., first conductivity rod 224). In particular, chamber sheath 252 includes a nonpermeable sidewall 262A and a sealed top wall 264A (e.g., positioned at mounting plate 230) that together form a radial chamber 270A about the first conductivity rod 224. Nonpermeable sidewall 262A extends from the top sheath end 266A at the sealed top wall 264A to a bottom sheath end 268A that is positioned below the top sheath end 266A. Nonpermeable sidewall 262A may be generally open at the bottom sheath end 268A such that a point of entry (e.g., exclusive point of entry) for radial chamber 270A is defined at bottom sheath end 268A by the nonpermeable sidewall 262A. Optionally, nonpermeable sidewall 262A is positioned coaxial with the first conductivity rod 224 (e.g., along the first axis 240). In certain embodiments, bottom sheath end 268A is generally positioned axially rearward from the bottom rod end 238A of first conductivity rod 224. Thus, at least a portion of bottom sheath end 268A is positioned above the bottom rod end 238A of first conductivity rod 224 (e.g., along the vertical direction V).

Although radial chamber 270A may be open at one end (e.g., bottom sheath end 268A), air contained therein by nonpermeable sidewall 262A and sealed top wall 264A may generally prevent the vertical entry of liquids into radial chamber 270A. For instance, as the level of liquids (e.g., wash additives) within tank cavity 216 increases, the liquids may be prevented from entering radial chamber 270A. Thus, the portion of fluid sensor assembly 220 enclosed therein may remain generally dry, irrespective of how much wash additive is provided therein. Advantageously, liquids may be prevented from accumulating between the conductivity rods (e.g., first conductivity rod 224 and second conductivity rod 226), such as after liquids within the tank cavity 216 have decreased below one or more of the bottom rod ends (e.g., bottom rod ends 238A, 238B).

Figure 8:
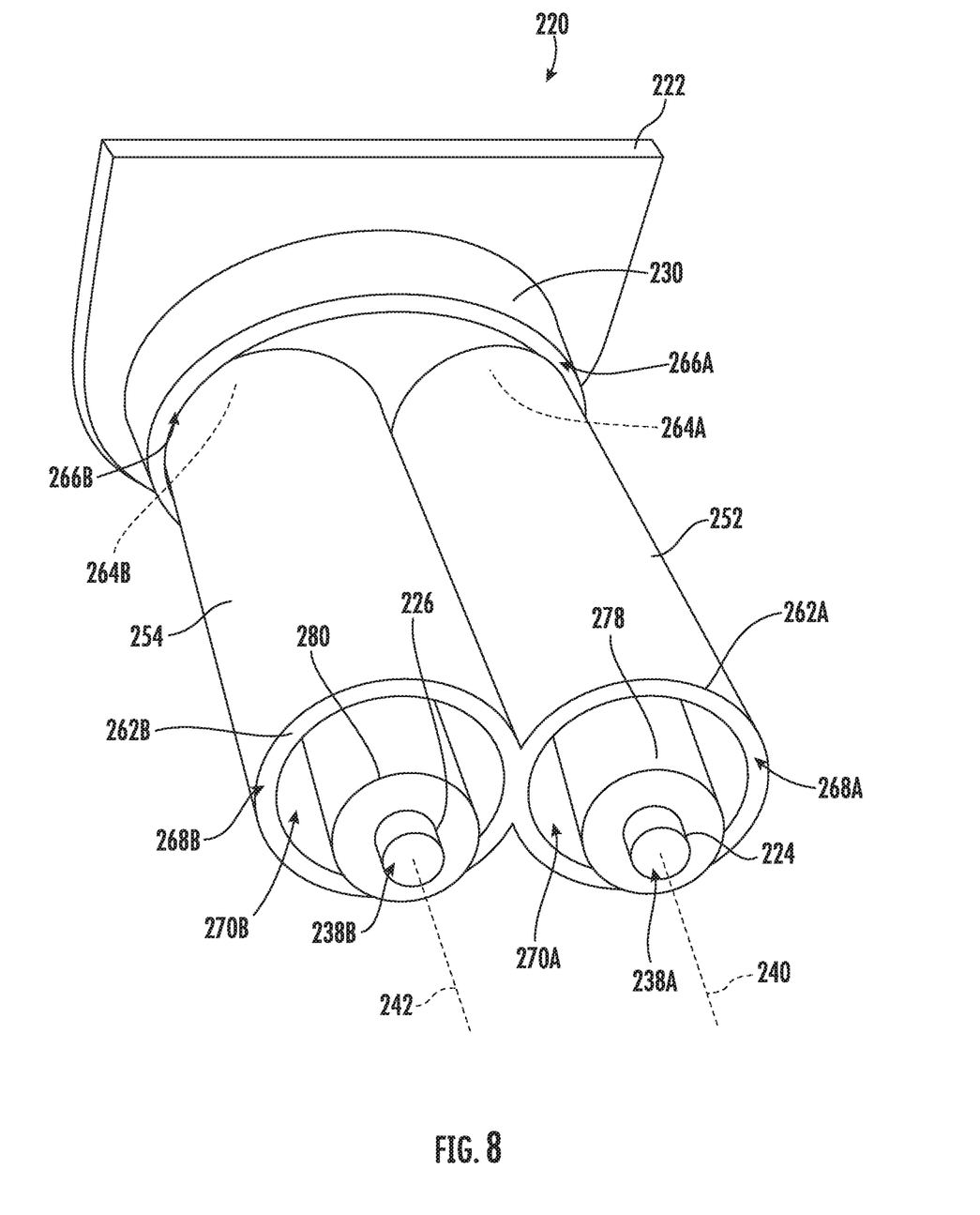
FIG. 8 provides a perspective view of a portion of a fluid sensor assembly according to exemplary embodiments of the present disclosure.

It is noted that although only a single chamber sheath 252 is illustrated in FIGS. 3 through 7, alternative embodiments may include multiple discrete chamber sheaths about unique corresponding conductivity rods. For instance, as shown in FIG. 8, some embodiments include a first chamber sheath 252 about first conductivity rod 224 (as described above) and a separate second chamber sheath 254 about second conductivity rod 226. Similar to first chamber sheath 252, second chamber sheath 254 includes a nonpermeable sidewall 262B and a sealed top wall 264B (e.g., positioned at mounting plate 230) that together form a radial chamber 270B about the second conductivity rod 226. Nonpermeable sidewall 262B extends from the top sheath end 266B at the sealed top wall 264B to a bottom sheath end 268B that is positioned below the top sheath end 266B. Nonpermeable sidewall 262B may be generally open at the bottom sheath end 268B such that a point of entry (e.g., exclusive point of entry) for radial chamber 270B is defined at bottom sheath end 268B by the nonpermeable sidewall 262B. Optionally, nonpermeable sidewall 262B of second chamber sheath 254 is positioned coaxial with the second conductivity rod 226 (e.g., along the second axis 242). In certain embodiments, bottom sheath end 268B is generally positioned axially rearward from the bottom rod end 238B of second conductivity rod 226. Thus, at least a portion of bottom sheath end 268B is positioned above the bottom rod end 238B of second conductivity rod 226 (e.g., along the vertical direction V).

Figure 9:
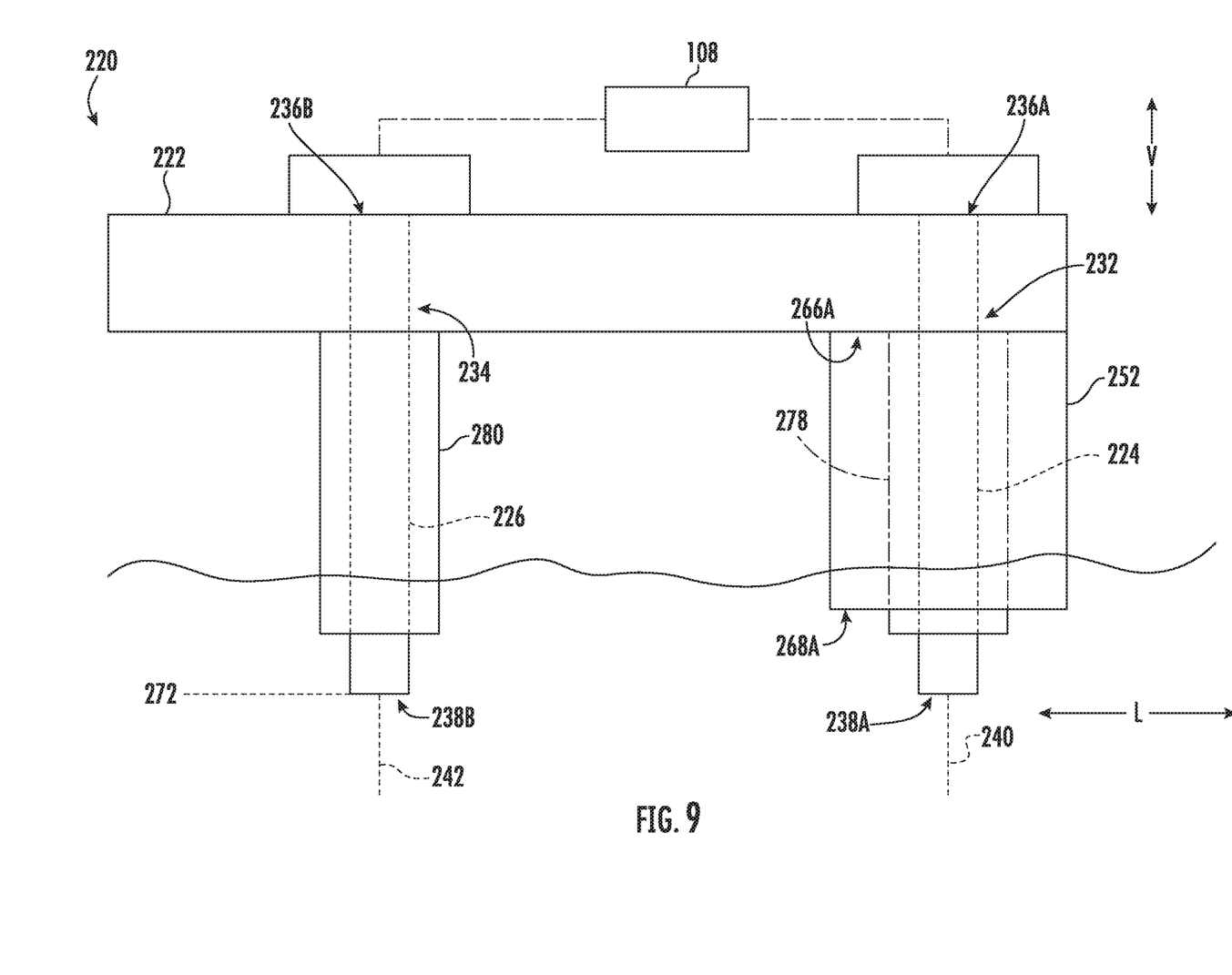
FIG. 9 provides a schematic side view of a fluid sensor assembly according to exemplary embodiments of the present disclosure.
Figure 10:
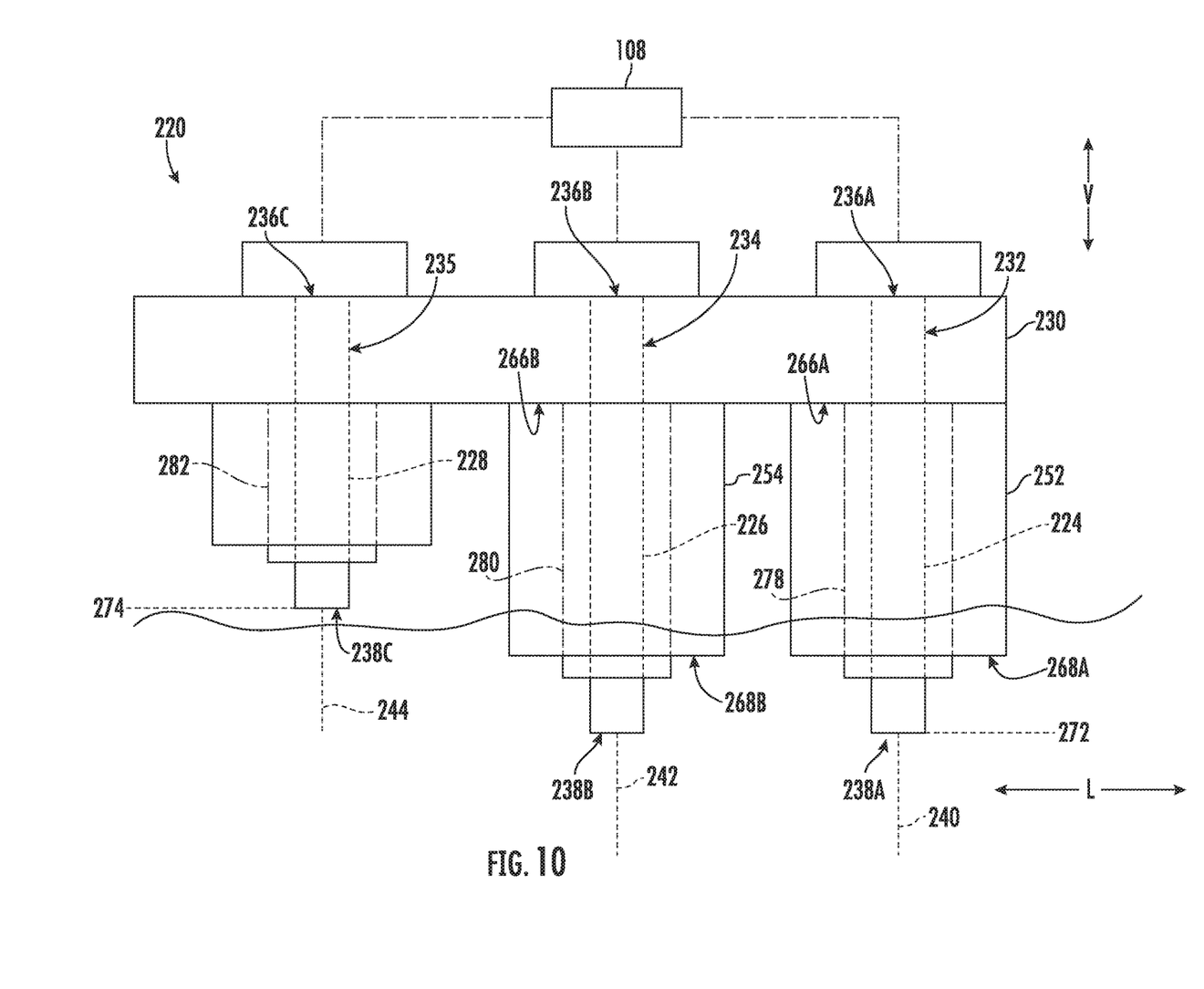
FIG. 10 provides a schematic side view of a fluid sensor assembly according to exemplary embodiments of the present disclosure.

Turning briefly to FIGS. 9 and 10, each conductivity rod (e.g., conductivity rods 224, 226, or 228) may further be operably connected (e.g., electrically coupled) to controller 108 to communicate therewith. For instance, conductivity rods 224, 226, or 228 may be operably connected to controller 108 via one or more suitable transmission paths, such as that defined by wire or wireless communications band. Controller 108 or conductivity rods 224, 226, or 228 may thus send or receive one or more signals therebetween.

Optionally, one or more conductivity rods may include a pair of parallel rods. For instance, first conductivity rod 224 and second conductivity rod 226 may each be mounted at parallel positions along a first level 272 (e.g., at the corresponding bottom rod ends 238A, 238B). Moreover, first conductivity rod 224 and second conductivity rod 226 may be spaced apart (e.g., in a direction perpendicular to the vertical direction V, such as the lateral direction L) at a predetermined distance such that liquid (e.g., wash additive) within tank cavity 216 contacts each at the same vertical fluid level.

As illustrated in FIG. 10, certain embodiments include additional conductivity rods, such as a third conductivity rod 228. Third conductivity rod 228 may extend along a third axis 244 (e.g., parallel to the first axis 240 or the second axis 242) between a top rod end 236C and a bottom rod end 238C that is positioned below the top rod end 236C (e.g., along the vertical direction V). In some embodiments, one or more of the conductivity rods 224, 226, 228 (e.g., the bottom rod ends 238A, 238B, 238C thereof) are provided at various discrete levels or positions along the vertical direction V. These various levels may include a lower or first level 272 as well as one or more elevated levels 274 that are higher along the vertical direction V than the lower or first level 272. For instance, the bottom rod end 238C of the third conductivity rod 228 may be positioned above the bottom rod end 238A of the first conductivity rod 224. Optionally, the third conductivity rod 228 may be connected in electrical series with the first conductivity rod 224 or second conductivity rod 226, such that liquid at the elevated level 274 bridges the electrical circuit between the conductivity rods 228 and 224 or 226.

Returning to FIGS. 3 through 7, first conductivity rod 224 or second conductivity rod 226 may extend along an axis (e.g., first axis 240 or second axis 242, respectively) that defines a nonparallel angle 276 with the vertical direction V (e.g., during washing operations or when washing machine appliance 100 is otherwise positioned upright, as shown in FIGS. 1 and 2). For instance, first axis 240 may form an intersecting and descending hypotenuse from the vertical direction V defining the nonparallel angle 276 between the first axis 240 and the vertical direction V. In some such embodiments, the nonparallel angle 276 is between 1° and 90°. In further embodiments, the nonparallel angle 276 is between is between 20° and 70°. In still further embodiments, the nonparallel angle 276 is between is between 35° and 45°.

Figure 4:
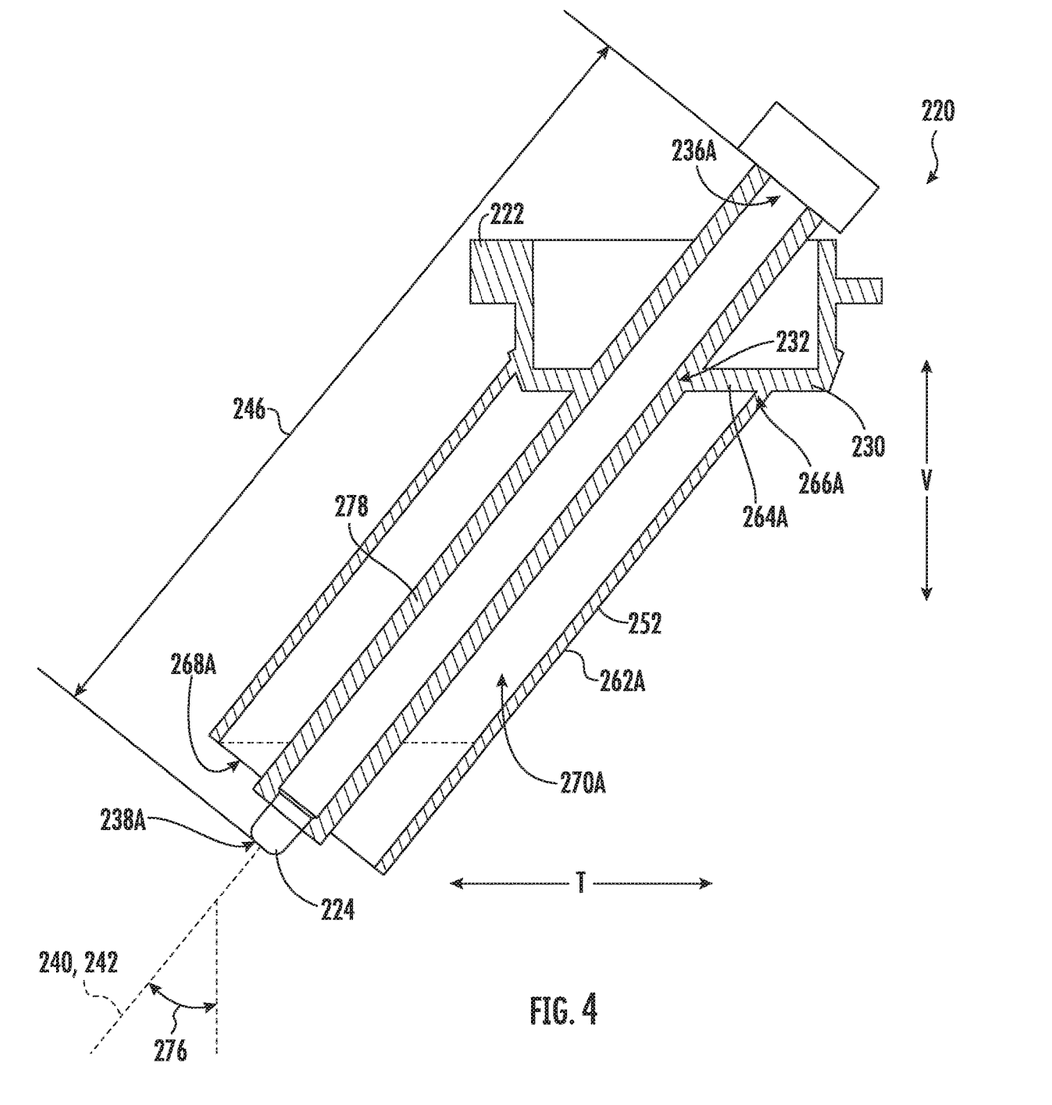
FIG. 4 provides a cross-sectional side view of a portion of the exemplary fluid sensor assembly of FIG. 3, wherein the fluid sensor assembly is in a use position.
Figure 5:
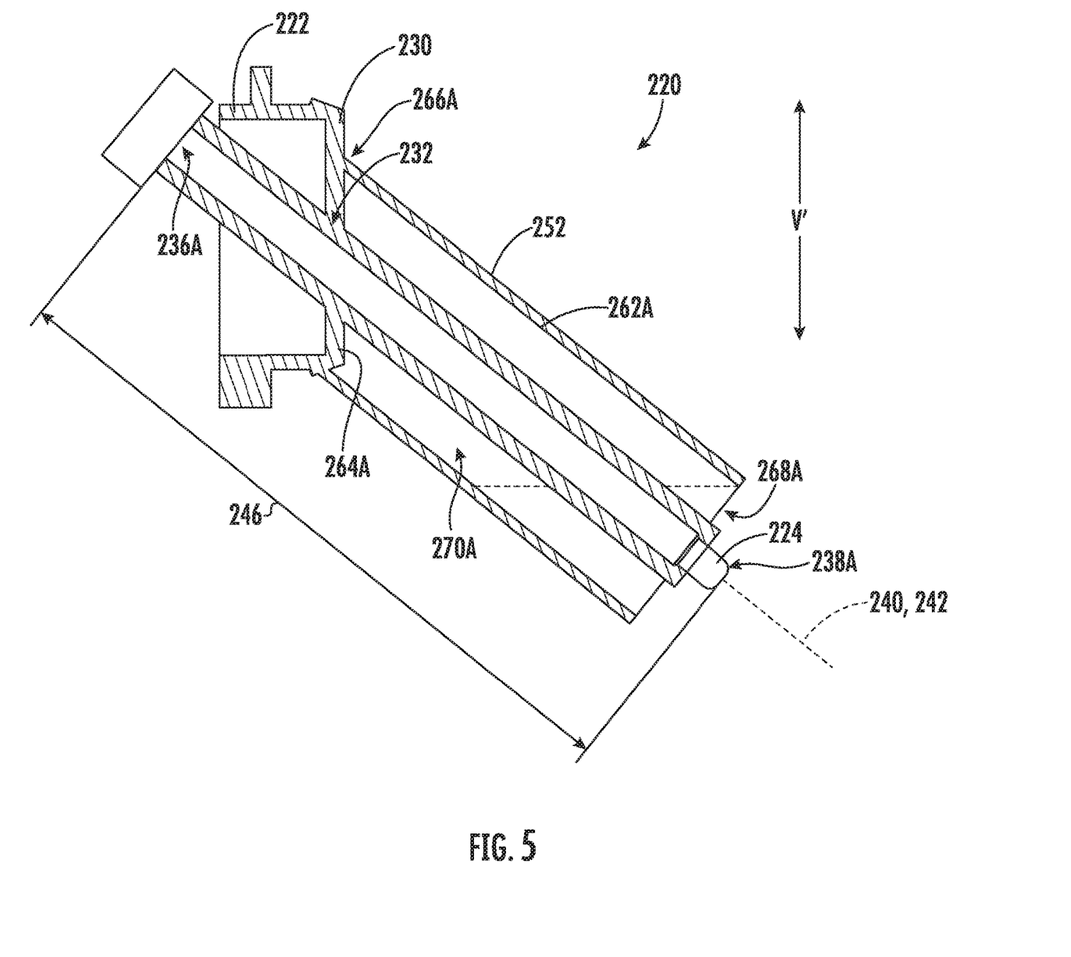
FIG. 5 provides a cross-sectional side view of a portion of the exemplary fluid sensor assembly of FIG. 3, wherein the fluid sensor assembly is in a service position.
Figure 6:
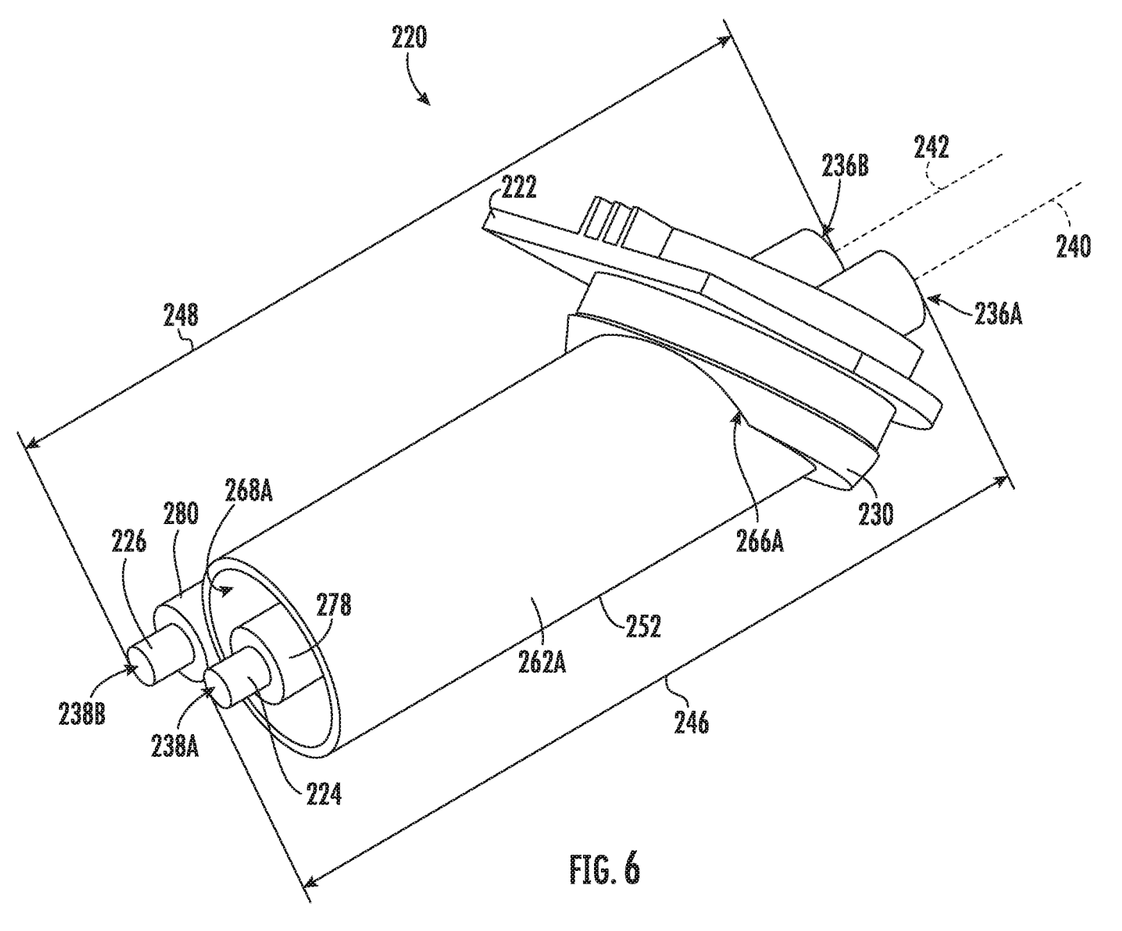
FIG. 6 provides a perspective side view of a portion of the exemplary fluid sensor assembly of FIG. 3.
Figure 7:
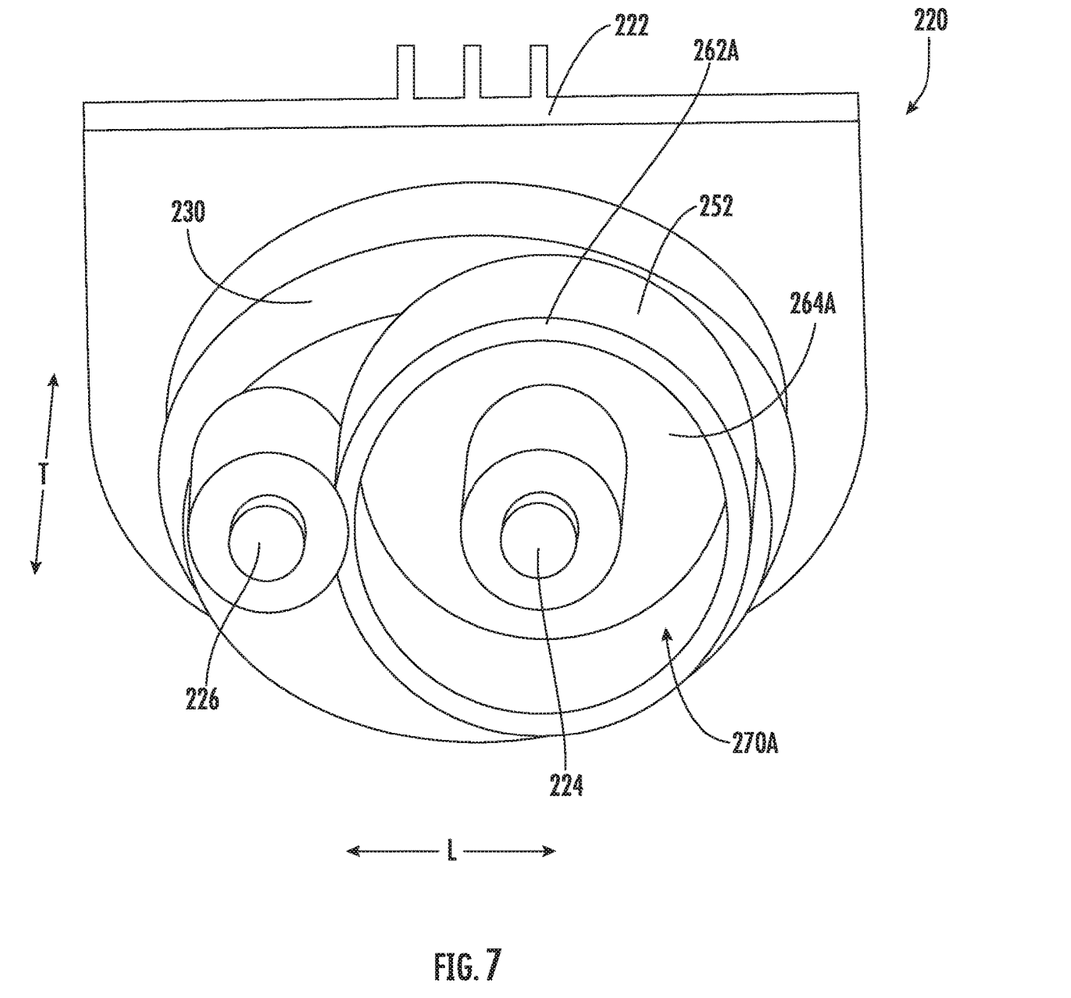
FIG. 7 provides a perspective bottom view of a portion of the exemplary fluid sensor assembly of FIG. 3.

In certain embodiments, at least one conductivity rod (e.g., first conductivity rod 224) is directed downward and toward a rear end (e.g., rear portion 107—FIG. 1) of cabinet 102 (FIG. 1). Thus, first conductivity rod 224 may generally descend along the vertical direction V while spanning a portion of the transverse direction T toward the rear portion 107 from the top rod end 236A to the bottom rod end 238A. As illustrated in FIGS. 4 and 5, rotating the entire cabinet 102 of the washing machine appliance 100 onto its rear portion 107, such as during service operations, may maintain at least a portion of chamber sheath 252 above the bottom rod end 238A of first conductivity rod 224 (e.g., relative to the ground or surface on which cabinet 102 rests). In other words, washing machine appliance 100 (including fluid sensor assembly 220) may be rotated between a use position (FIG. 4) and a service position (FIG. 5) while maintaining at least a portion of chamber sheath 252 (e.g., top sheath end 266A) above the bottom rod end 238A of first conductivity rod 224 (e.g., along an absolute vertical direction V' defined within respect to the ground or service on which cabinet 102 is placed). Advantageously, any portion of wash additive within tank cavity 216 may be prevented from entering radial chamber 270A, even as washing machine appliance 100 is rotated on its rear portion 107 for service.

As illustrated in FIGS. 3 through 10, a rod sleeve may extend about a corresponding conductivity rod (e.g., within tank cavity 216). For instance, a first rod sleeve 278 may be positioned on first conductivity rod 224 and extend from the mounting plate 230 (e.g., along the first axis 240) to a portion of first conductivity rod 224 above the bottom rod end 238A thereof. Optionally, first rod sleeve 278 may be formed integrally (e.g., a unitary monolithic member) with mounting plate 230. Moreover, first rod sleeve 278 may contact and cover the portion of first conductivity rod 224 along which it extends. In some such embodiments, first rod sleeve 278 extends from and coaxially with first aperture 232.

In additional embodiments, each conductivity rod includes a separate corresponding rod sleeve. For instance, a second rod sleeve 280 may be positioned on second conductivity rod 226 and extend from the mounting plate 230 (e.g., along second axis 242) to a portion of second conductivity rod 226 above the bottom rod end 238B thereof. A third rod sleeve 282 may be positioned on third conductivity rod 228 and extend from the mounting plate 230 (e.g., along third axis 244) to a portion of third conductivity rod 228 above the bottom rod end 238C thereof. Second rod sleeve 280 and third rod sleeve 282 may contact and cover the portion of second conductivity rod 226 and third conductivity rod 228, respectively, along which they extend. In some such embodiments, second rod sleeve 280 extends from and coaxially with second aperture 234 while third rod sleeve 282 extends from and coaxially with a third aperture 235. Additionally or alternatively, second rod sleeve 280 or third rod sleeve 282 may be formed integrally (e.g., a unitary monolithic member) with mounting plate 230. Advantageously, the integral structure between mounting plate 230 and the rod sleeve(s) 278, 280, 282 may prevent liquid additive from passing through one or more of the apertures 232, 234, 235.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fluid sensor assembly for a liquid tank of an appliance comprising a cabinet the fluid sensor assembly comprising:
    a first conductivity rod extending along a first axis toward a rear end of the cabinet between a top rod end and a bottom rod end positioned below the top rod end;
    a second conductivity rod extending along a second axis toward the rear end of the cabinet between a top rod end and a bottom rod end positioned below the top rod end;
    a chamber sheath comprising a non-permeable sidewall and a sealed top wall, the non-permeable sidewall extending about the first conductivity rod from a top sheath end to a bottom sheath end positioned below the top sheath end, the top sheath end being positioned on the sealed top wall, at least a portion of the bottom sheath end being positioned above the bottom rod end of the first conductivity rod, the non-permeable sidewall being radially spared apart from the first conductivity rod and defining a radial chamber therebetween; and
    a controller operably connected to the first conductivity rod and the second conductivity rod to receive signals therefrom,
    wherein the first axis is parallel to the second axis, and
    wherein the first axis defines a nonparallel angle between 20° and 70° with a vertical direction.

2. The fluid sensor assembly of claim 1, wherein the non-permeable sidewall is coaxial with the first conductivity rod about a first axis.

3. The fluid sensor assembly of claim 1, wherein the appliance is a washing machine appliance, and wherein the fluid sensor assembly is positioned within the washing machine appliance.

4. The fluid sensor assembly of claim 1, further comprising a rod sleeve positioned on the first conductivity rod and extending from the sealed top wall.

5. The fluid sensor assembly of claim 1, wherein the chamber sheath is a first chamber sheath, and wherein the fluid sensor assembly further comprises a second chamber sheath comprising a non-permeable sidewall and a sealed top wall, the non-permeable sidewall of the second chamber sheath extending about the second conductivity rod from a top sheath end to a bottom sheath end, the top sheath end being positioned on the sealed top wall of the second chamber sheath, at least a portion of the bottom sheath end being positioned above the bottom rod end of the second conductivity rod, the non-permeable sidewall being radially spaced apart from the second conductivity rod and defining a second radial chamber therebetween.

6. The fluid sensor assembly of claim 1, further comprising a third conductivity rod extending between a top rod end and a bottom rod end positioned below the top rod end, the bottom rod end of the third conductivity rod being positioned above the bottom rod end of the first conductivity rod.

7. A washing machine appliance comprising:
    a cabinet extending along a vertical direction from a top end to a bottom end, the cabinet further extending along a transverse direction from a front end to a rear end;
    a basket mounted within the cabinet, the basket defining a chamber for receipt of a load of items for washing;
    a storage tank positioned within the cabinet, the storage tank defining a bulk cavity for receiving a wash additive; and
    a fluid sensor assembly mounted to the storage tank, the fluid sensor assembly comprising
        a first conductivity rod extending along a first axis toward the rear end between a top rod end and a bottom rod end positioned within the bulk cavity below the top rod end,
        a second conductivity rod extending along a second axis toward the rear end between a top rod end and a bottom rod end positioned within the bulk cavity below the top rod end, and
        a chamber sheath comprising a non-permeable sidewall and a sealed top wall, the non-permeable sidewall extending about the first conductivity rod from a top sheath end to a bottom sheath end positioned within the bulk cavity below the top sheath end, the top sheath end being positioned on the sealed top wall, at least a portion of the bottom sheath end being positioned above the bottom rod end of the first conductivity rod, the non-permeable sidewall being radially spaced apart from the first conductivity rod and defining a radial chamber therebetween, and
        a controller operably connected to the first conductivity rod and the second conductivity rod to receive signals therefrom, wherein the first axis is parallel to the second axis, and wherein the first axis defines a nonparallel angle between 20° and 70° with a vertical direction.

8. The washing machine appliance of claim 7, wherein the non-permeable sidewall is coaxial with the first conductivity rod about a first axis.

9. The washing machine appliance of claim 7, wherein the fluid sensor assembly is positioned within the cabinet.

10. The washing machine appliance of claim 7, wherein the fluid sensor assembly further comprises a rod sleeve positioned on the first conductivity rod and extending from the sealed top wall.

11. The washing machine appliance of claim 7, wherein the chamber sheath is a first chamber sheath, and wherein the fluid sensor assembly further comprises a second chamber sheath comprising a non-permeable sidewall and a sealed top wall, the non-permeable sidewall of the second chamber sheath extending about the second conductivity rod from a top sheath end to a bottom sheath end positioned below the top sheath end, the top sheath end being positioned on the sealed top wall of the second chamber sheath, at least a portion of the bottom sheath end being positioned above the bottom rod end of the second conductivity rod, the non-permeable sidewall being radially spaced apart from the second conductivity rod and defining a second radial chamber therebetween.

12. The washing machine appliance of claim 7, wherein the fluid sensor assembly further comprises a third conductivity rod extending between a top rod end and a bottom rod end positioned below the top rod end, the bottom rod end of the third conductivity rod being positioned above the bottom rod end of the first conductivity rod.

13. An appliance comprising:
a cabinet extending along a vertical direction from a top end to a bottom end, the cabinet further extending along a transverse direction from a front end to a rear end, the cabinet being rotatable between a use position supported on the bottom end and a service position supported on the rear end;
a storage tank positioned within the cabinet, the storage tank defining a bulk cavity for receiving a wash additive; and
a fluid sensor assembly mounted to the storage tank to rotate therewith between the use position and the service position, the fluid sensor assembly comprising
a first conductivity rod extending along a first axis between a top rod end and a bottom rod end positioned within the bulk cavity below the top rod end,
a second conductivity rod extending along a second axis between a top rod end and a bottom rod end positioned within the bulk cavity below the top rod end, and
a chamber sheath comprising a non-permeable sidewall and a sealed top wall, the non-permeable sidewall extending about the first conductivity rod from a top sheath end to a bottom sheath end positioned within the bulk cavity below the top sheath end, the top sheath end being positioned on the sealed top wall, at least a portion of the bottom sheath end being positioned above the bottom rod end of the first conductivity rod, the non-permeable sidewall being radially spaced apart from the first conductivity rod and defining a radial chamber therebetween, and
a controller operably connected to the first conductivity rod and the second conductivity rod to receive signals therefrom,
wherein the first axis is parallel to the second axis,
wherein, in the use position, the first axis defines a nonparallel angle between 20° and 70° with a vertical direction, and
wherein, in both the use position and the service position, the first and second conductivity rods are directed downward and toward the rear end.

\* \* \* \* \*